(12) United States Patent
Song et al.

(10) Patent No.: US 11,581,134 B2
(45) Date of Patent: Feb. 14, 2023

(54) BIFILAR WINDING SYSTEM FOR MANUFACTURE OF POLOIDAL FIELD SUPERCONDUCTING MAGNETS FOR NUCLEAR FUSION

(71) Applicant: Hefei Institutes of Physical Science, Chinese Academy of Sciences, Anhui (CN)

(72) Inventors: Yuntao Song, Anhui (CN); Wei Wen, Anhui (CN); Guang Shen, Anhui (CN); Kun Lu, Anhui (CN); Weiyue Wu, Anhui (CN); Jing Wei, Anhui (CN)

(73) Assignee: Hefei Institutes of Physical Science, Chinese Academy of Sciences, Hefei (CN)

( * ) Notice: Subject to any disclaimer, the term of this patent is extended or adjusted under 35 U.S.C. 154(b) by 611 days.

(21) Appl. No.: 16/567,071

(22) Filed: Sep. 11, 2019

(65) Prior Publication Data
US 2021/0074475 A1 Mar. 11, 2021

(51) Int. Cl.
*H01F 41/04* (2006.01)
*H01F 6/06* (2006.01)
(Continued)

(52) U.S. Cl.
CPC ............ *H01F 41/048* (2013.01); *B08B 3/12* (2013.01); *H01F 6/06* (2013.01); *H01F 41/066* (2016.01);
(Continued)

(58) Field of Classification Search
CPC .... H01F 41/048; H01F 41/066; H01F 41/069; H01F 6/06; H01F 41/082; Y10T 29/49014; B08B 3/12
See application file for complete search history.

(56) References Cited

U.S. PATENT DOCUMENTS 4,617,789 A * 10/1986 Borden ............ Y10T 29/49014
29/599

FOREIGN PATENT DOCUMENTS

CN 2376060 Y 4/2000
CN 104658736 B 6/2018
(Continued)

OTHER PUBLICATIONS

S. E. Yang et al., "Manufacture and Test of the Bifilar Wound Coil Using Coated Conductor With Stainless Steel Stabilizer," in IEEE Transactions on Applied Superconductivity, vol. 17, No. 2, pp. 1867-1870, Jun. 2007, doi: 10.1109/TASC.2007.897774. (Year: 2007).*

(Continued)

*Primary Examiner* — A. Dexter Tugbang (57) ABSTRACT

A bifilar winding system for the manufacture of poloidal field superconducting magnets for nuclear fusion includes two superconducting coil winding production lines which are symmetrically arranged, a dropping fixture, a rotary platform and a winding mold, and an automatic control system. Each of the two winding production lines includes a conductor unwinding device, a straightener, an ultrasonic cleaning machine, a sandblasting and cleaning machine, a bending machine, an inter-turn insulation taping machine. During the winding of a coil, a superconducting conductor is unwound by the conductor unwinding device under the control of the automatic control system, then straightened, ultrasonically cleaned, sandblasted and cleaned, and bent into a desired radius, then wrapped with multiple layers of insulating tape by the inter-turn insulation taping machine, and finally fixed, by the dropping fixture, precisely on the rotary platform at a correct position within a profile of the winding mold.

9 Claims, 9 Drawing Sheets

(51) Int. Cl.
- *B08B 3/12* (2006.01)
- *H01F 41/066* (2016.01)
- *H01F 41/069* (2016.01)
- *H01F 41/082* (2016.01)

(52) U.S. Cl.
CPC ......... *H01F 41/069* (2016.01); *H01F 41/082* (2016.01)

(56) References Cited

FOREIGN PATENT DOCUMENTS

| | | | |
|---|---|---|---|
| JP | 2009295292 A | * | 12/2009 |
| RU | 2014146558 A | | 6/2016 |

OTHER PUBLICATIONS

Machine Translation of Chinese Patent Publication, CN 2376060 Y, Jun. 2022. (Year: 2022).*

* cited by examiner

BIFILAR WINDING SYSTEM FOR MANUFACTURE OF POLOIDAL FIELD SUPERCONDUCTING MAGNETS FOR NUCLEAR FUSION

TECHNICAL FIELD

The present invention relates to the manufacture of superconducting magnets for thermonuclear fusion, and in particular to a bifilar winding system for the manufacture of poloidal field superconducting magnets for nuclear fusion.

BACKGROUND OF THE PRESENT INVENTION

Thermonuclear fusion will provide inexhaustible clean energy for humans, and the international thermonuclear experimental reactor (ITER) program will be completed in the next decade. Superconducting magnets provide a required magnetic field for a tokamak, in order to control and constrain the high-temperature plasma.

The poloidal field magnet, as one of main magnets of the tokamak superconducting magnet, is used to control the shape of plasma and stabilize the morphology of plasma. Due to the manufacture of conductors, the length of a single superconducting conductor is often less than 1 km. In order to manufacture superconducting magnet coils with large ampere-turns, large-sized poloidal field superconducting magnet coils for nuclear fusion are usually designed in a double-pancake structure, and two conductors are connected by a joint between the double pancakes to overcome the defect of insufficient length of a single conductor. To this end, the coil must be manufactured by bifilar winding. At present, in China, there is no research on bifilar winding for large-sized superconducting magnets for poloidal field, with limited experience in designing production lines that can meet requirements on high-precision form and surface cleanliness of the wound large-sized superconducting magnet coils and can realize automatic inter-turn insulation wrapping. In view of the state in the prior art, a bifilar winding system for manufacturing nuclear fusion poloidal field superconducting magnets is invented to provide a mature and feasible solution.

SUMMARY OF THE INVENTION

An objective of the present invention is to provide a bifilar winding system for the manufacture of poloidal field superconducting magnets for nuclear fusion, to realize high-precision bifilar winding of poloidal field superconducting magnet.

For this purpose, the present invention employs the following technical solutions.

Provided is a bifilar winding system for the manufacture of poloidal field superconducting magnets for nuclear fusion, comprising:

two superconducting coil winding production lines which are symmetrically arranged;
a rotary platform;
a dropping fixture; and
a winding mold;
wherein each of the two superconducting coil winding production lines comprises a conductor unwinding device, a straightener, an ultrasonic cleaning machine, a sandblasting and cleaning machine, a bending machine, and an inter-turn insulation taping machine; the bending machine and the inter-turn insulation taping machine in each of the two superconducting coil winding production lines are arranged on the rotary platform, and the dropping fixture and the winding mold are arranged on the rotary platform; during the winding of a coil, a superconducting conductor is unwound by the conductor unwinding device in each of the two superconducting coil winding production lines, then straightened by the straightening machine, ultrasonically cleaned by the ultrasonic cleaning machine, sandblasted and cleaned by the sandblasting and cleaning machine, and bent into a desired radius by the respective bending machine on the rotary platform, then wrapped with multiple layers of insulating tape by the respective inter-turn insulation taping machine, and finally fixed, by the dropping fixture, at a correct position within a profile of the winding mold.

The conductor unwinding device comprises a pre-straightener and a conductor unwinding cylinder that is rotatable and is driven by a motor, a superconducting conductor to be wound is wound around the conductor unwinding cylinder, and the conductor unwinding cylinder is driven by the motor to unwind the superconducting conductor; the conductor unwinding device bears the superconducting conductor having a diameter of 3.5-4.5 m and a mass of 12-16 t; the conductor unwinding device unwinds the superconducting conductor according to a coil winding direction and a coil winding speed and ensures that the superconducting conductor is unwound at the same height; and the conductor unwinding device pre-straightens the superconducting conductor and provides the straightening device in the subsequent process with the superconducting conductor having a constant radius.

The straightener comprises a row of driving wheels which are rotatable and are driven by a motor and a row of driven wheels arranged opposite to the row of driving wheels, the driving wheels and the driven wheels are alternately arranged; the superconducting conductor passes between the row of driving wheels and the row of driven wheels, and the superconducting conductor is straightened by the driving wheels and the driven wheels; and the superconducting conductor having a constant radius is straightened in high precision by the straightener, and the straightness of the straightened superconducting conductor is superior to 0.3 mm/1000 mm.

The ultrasonic cleaning machine comprises a first cleaning chamber, an ultrasonic generator arranged on a side of the first cleaning chamber, a deionized water tank for storing deionized water and a cleaning liquid tank for storing cleaning liquid; the deionized water tank and the cleaning liquid tank communicate with the first cleaning chamber respectively by a pump and a pipeline; the superconducting conductor enters the first cleaning chamber from one end of the first cleaning chamber and goes out from the other end of the first cleaning chamber; the deionized water and the cleaning liquid are fed into the first cleaning chamber respectively from the deionized water tank and the cleaning liquid tank, and ultrasonic waves are transmitted by the ultrasonic generator into the first cleaning chamber to clean the superconducting conductor; the ultrasonic cleaning machine heats an alkaline bubble-free solution, and ultrasonically cleans the superconducting conductor by the high-temperature alkaline bubble-free solution to remove oil on a surface of the superconducting conductor and then blow-dries the superconducting conductor, so that the surface of the superconducting conductor cleaned by the ultrasonic cleaning machine is clean and is capable of passing a water break test.

The sandblasting and cleaning machine comprises a sandblasting chamber, a second cleaning chamber, a sandblasting machine, a balanced water tank and an automatic sand feeder; the superconducting conductor enters the sandblasting chamber from one end of the sandblasting chamber, then enters the second cleaning chamber from one end of the second cleaning chamber after going out from the other end of the sandblasting chamber, and finally goes out from the other end of the second cleaning chamber; the automatic sand feeder is connected to the sandblasting machine; a sand jet of the sandblasting machine communicates with the sandblasting chamber; the balanced water tank communicates with the second cleaning chamber; the sandblasting and cleaning machine blasts sands onto the surface of the superconducting conductor; the roughness of the sandblasted surface is uniform and within Ra3-6 μm; and the sandblasted conductor is cleaned by deionized water and blow-dried by finely filtered compressed air.

The bending machine comprises a pair of guiding wheels, a plurality of pairs of feeding wheels, a shaping wheel, a pressing wheel and an inkjet printer, which are driven by a motor respectively; one feeding wheel in each pair of feeding wheels is a driving feeding wheel and the other one is a driven feeding wheel; the superconducting conductor is guided by the pair of guiding wheels, then successively passes through the plurality of pairs of feeding wheels and the shaping wheel, and then is sent to the pressing wheel; the pressing wheel is driven by a motor or a piston cylinder to do linear motion, and the pressing wheel moves to the superconducting conductor to bend the superconducting conductor; the inkjet printer is arranged opposite to the shaping wheel, and by considering a position of the shaping wheel as a feature point, sand is blasted onto the superconducting conductor by the inkjet printer at the feature point; the bending machine further comprises an encoder that measures a length of the superconducting conductor according to a length formed by rotation of the guiding wheel or the driving feeding wheel; the bending machine precisely measures a feeding length of the superconducting conductor, with a precision for measuring the length being superior to 300 ppm; the inkjet printer is mounted on the bending machine to spurt codes on the surface of the superconducting conductor at the feature point; and the bending machine bends a coil containing an inter-turn transition section into a high-precision radius with no tension.

Multiple layers of insulating tape are wrapped by the inter-turn insulation taping machine in half-lapping manner with a constant tension, with a desired distance reserved between the layers of insulating tape, and the wrapped insulating tape is flat, without any wrinkle or bulge.

The rotary platform has a flatness of less than 1 mm under idle and load conditions, and the winding mold mounted on the rotary platform has a profile tolerance of less than 1 mm; a conductor holder and a guide mechanism, by which the superconducting conductor falls onto the rotary platform slowly and smoothly after being wrapped for inter-turn insulation, are mounted on the rotary platform; the dropping fixture is mounted on the rotary platform, which drops the superconducting conductor falling onto the rotary platform into the winding mold and then tightly clamps the superconducting conductor to ensure that the superconducting conductor is at a correct position within the profile of the winding mold; a reference line for the coil feature point is drawn on the rotary platform, and a deviation between the drawn reference line and a theoretical reference line is less than 0.5 mm.

The bifilar winding system further comprises an automatic control system which operates respective devices in the two superconducting coil winding production lines, the rotary platform and respective devices on the rotary platform, separately or cooperatively; the automatic control system recognizes an alarm signal, and continues alarming or makes an urgent halt according to the alarm signal; and the automatic control system coordinates and links respective devices by close-loop position control, which ensures high synchronization of respective devices in each of the two superconductive coil winding production lines, and realizes high synchronization of the two superconductive coil winding production lines through the rotary platform.

The system of the present invention can realize high-precision bifilar winding for poloidal field superconducting magnet double-pancake coils, with the advantages of easy use and high winding precision.

DETAILED DESCRIPTION OF THE PRESENT INVENTION

Figure 1:
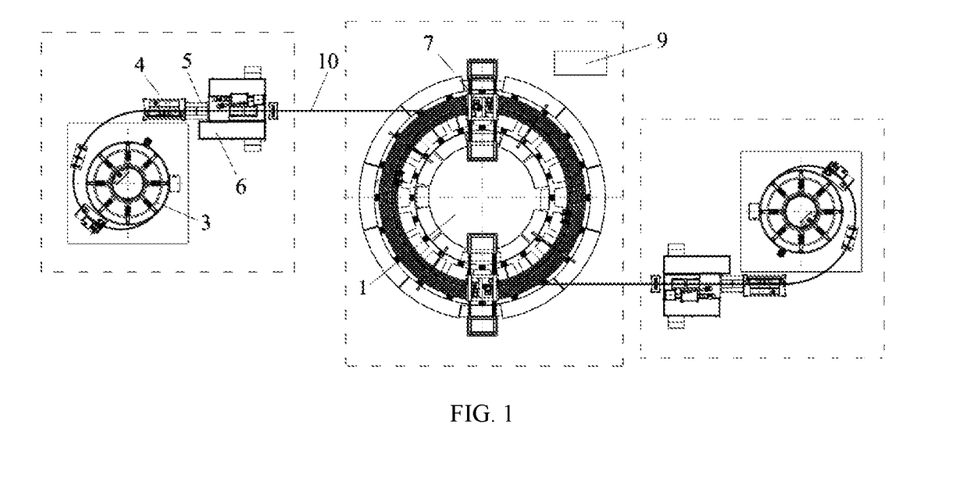
FIG. 1 is a schematic diagram of a bifilar winding system according to the present invention.

As shown in FIG. 1, illustrated is a bifilar winding system for the manufacture of poloidal field superconducting magnets for nuclear fusion, comprising two superconducting coil winding production lines which are symmetrically arranged, a rotary platform 1, a dropping fixture 2 and a winding mold; each of the two superconducting coil winding production lines comprises a conductor unwinding device 3, a straightener 4, an ultrasonic cleaning machine 5, a sandblasting and cleaning machine 6, a bending machine 7, and an inter-turn insulation taping machine 8. The bending machine 7 and the inter-turn insulation taping machine 8 in each of the two superconducting coil winding production lines are arranged on the rotary platform 1, and the dropping fixture 2 and the winding mold are also arranged on the rotary platform 1. During the winding of a coil, a superconducting conductor 10 is unwound by the conductor unwinding device 3 in each of the two superconducting coil winding production lines, then straightened by the straightener 4, ultrasonically cleaned by the ultrasonic cleaning machine 5, sandblasted and cleaned by the sandblasting and cleaning machine 6, and bent into a desired radius by the respective bending machine 7 on the rotary platform 1, then wrapped with multiple layers of insulating tape by the respective inter-turn insulation taping machine 8, and finally fixed, by the dropping fixture 2, at a correct position within a profile of the winding mold.

Figure 2A:
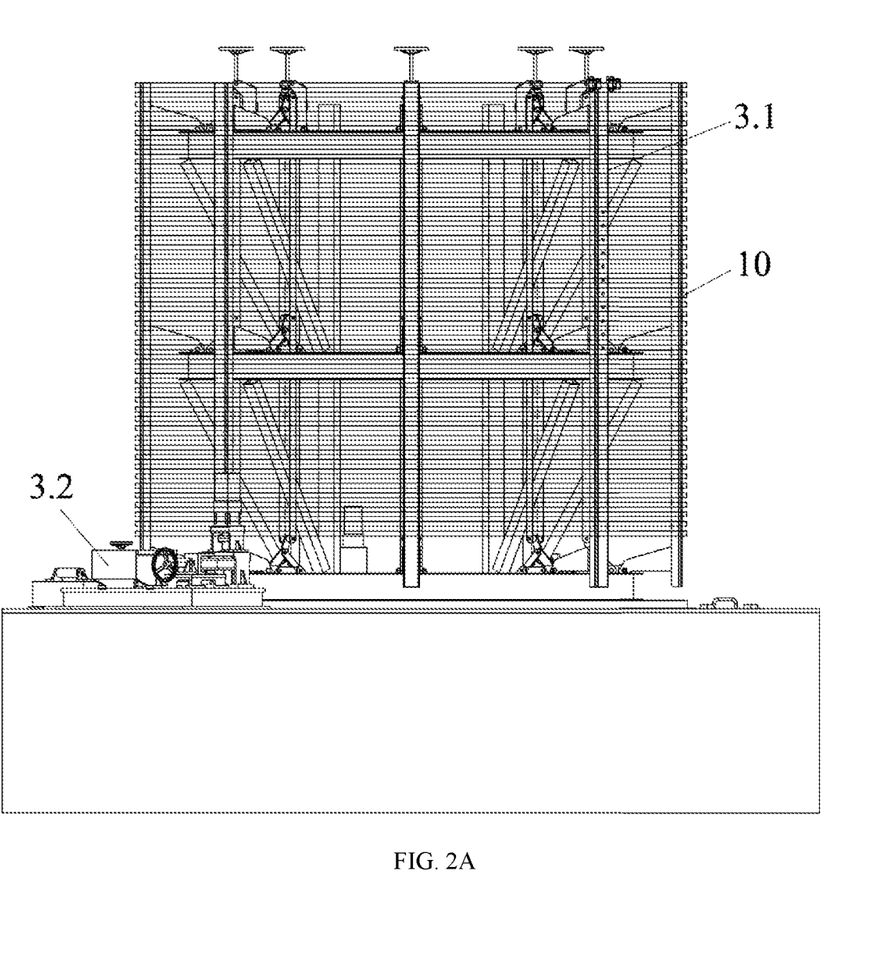
FIG. 2A is a front view of a conductor unwinding device of the bifilar winding system according to the present invention.
Figure 2B:
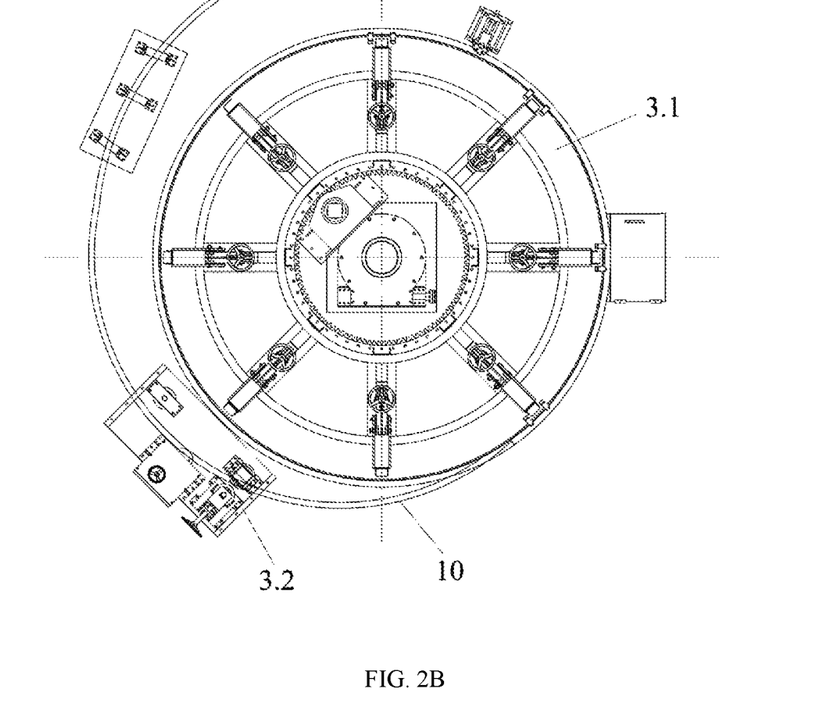
FIG. 2B is a top view of the conductor unwinding device of the bifilar winding system according to the present invention.

As shown in FIGS. 2A and B, the conductor unwinding device 3 comprises a pre-straightener 3.2 and a conductor unwinding cylinder 3.1 that is rotatable and is driven by a motor. A superconducting conductor 10 to be wound is wound around the conductor unwinding cylinder 3.1, and the conductor unwinding cylinder 3.1 is driven by the motor to unwind the superconducting conductor 10. The conductor unwinding device bears the superconducting conductor having a diameter of 3.5-4.5 m and a mass of 12-16 t. The conductor unwinding device unwinds the superconducting conductor according to a coil winding direction and a coil winding speed and ensures that the superconducting conductor is unwound at the same height. The conductor unwinding device pre-straightens the superconducting conductor and provides the straightening device in the subsequent process with the superconducting conductor having a constant radius.

Figure 3A:
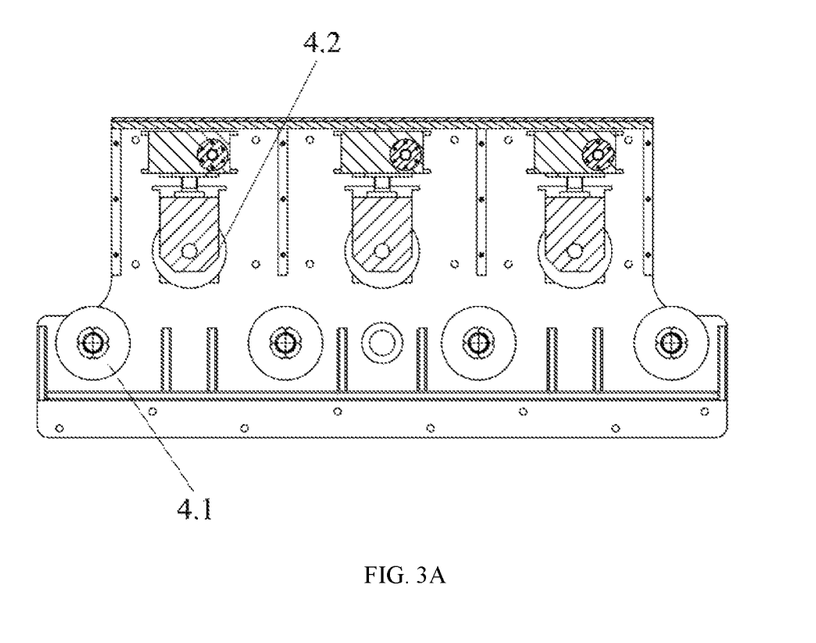
FIG. 3A is a top view of a straightener of the bifilar winding system according to the present invention.
Figure 3B:
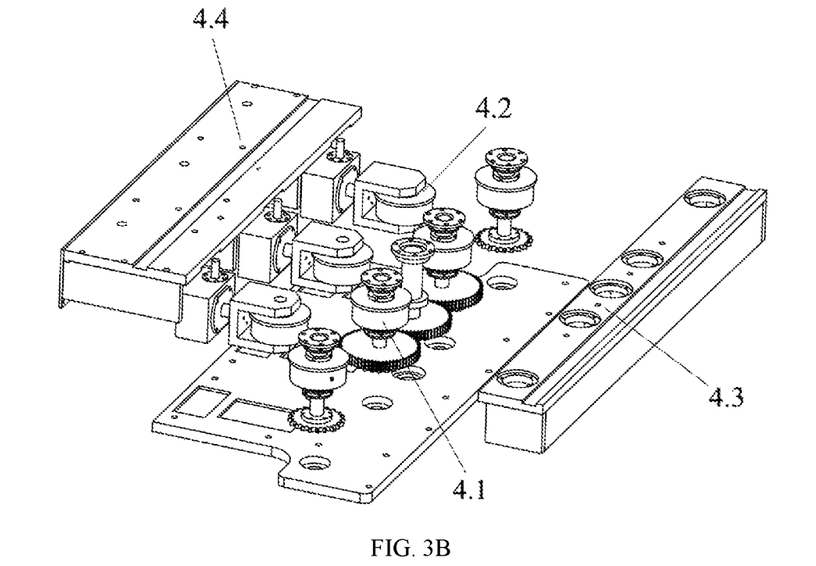
FIG. 3B is an exploded view of the straightener of the bifilar winding system according to the present invention.

As shown in FIGS. 3A-B, the straightener 4 comprises a row of driving wheels 4.1 which are rotatable and are driven by a motor and a row of driven wheels 4.2 arranged opposite to the row of driving wheels. The driving wheels 4.1 are mount on a driving-wheel fixation plate 4.3 and the driven wheels 4.2 are mounted on a driven-wheel fixation plate 4.4. The driving wheels 4.1 and the driven wheels 4.2 are alternately arranged, and the superconducting conductor 10 passes between the row of driving wheels and the row of driven wheels, and the superconducting conductor is straightened by the driving wheels 4.1 and the driven wheels 4.2. The superconducting conductor having a constant radius is straightened in high precision by the straightener 4, and the straightness of the straightened conductor is superior to 0.3 mm/1000 mm.

Figure 4A:
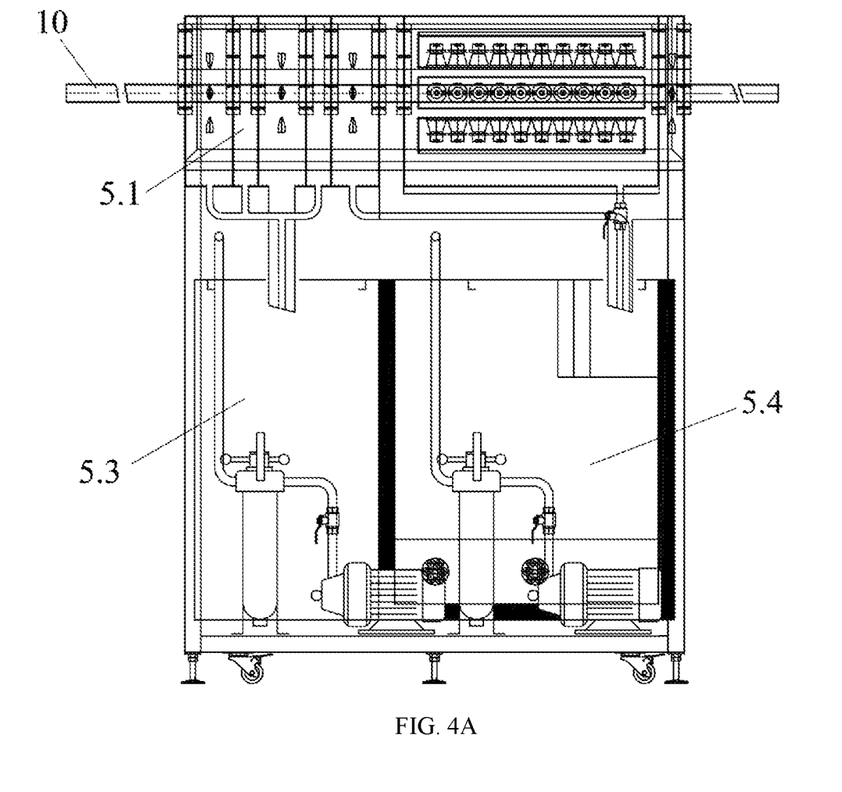
FIG. 4A is a front view of an ultrasonic cleaning machine of a double-pancake winding system according to the present invention.
Figure 4B:
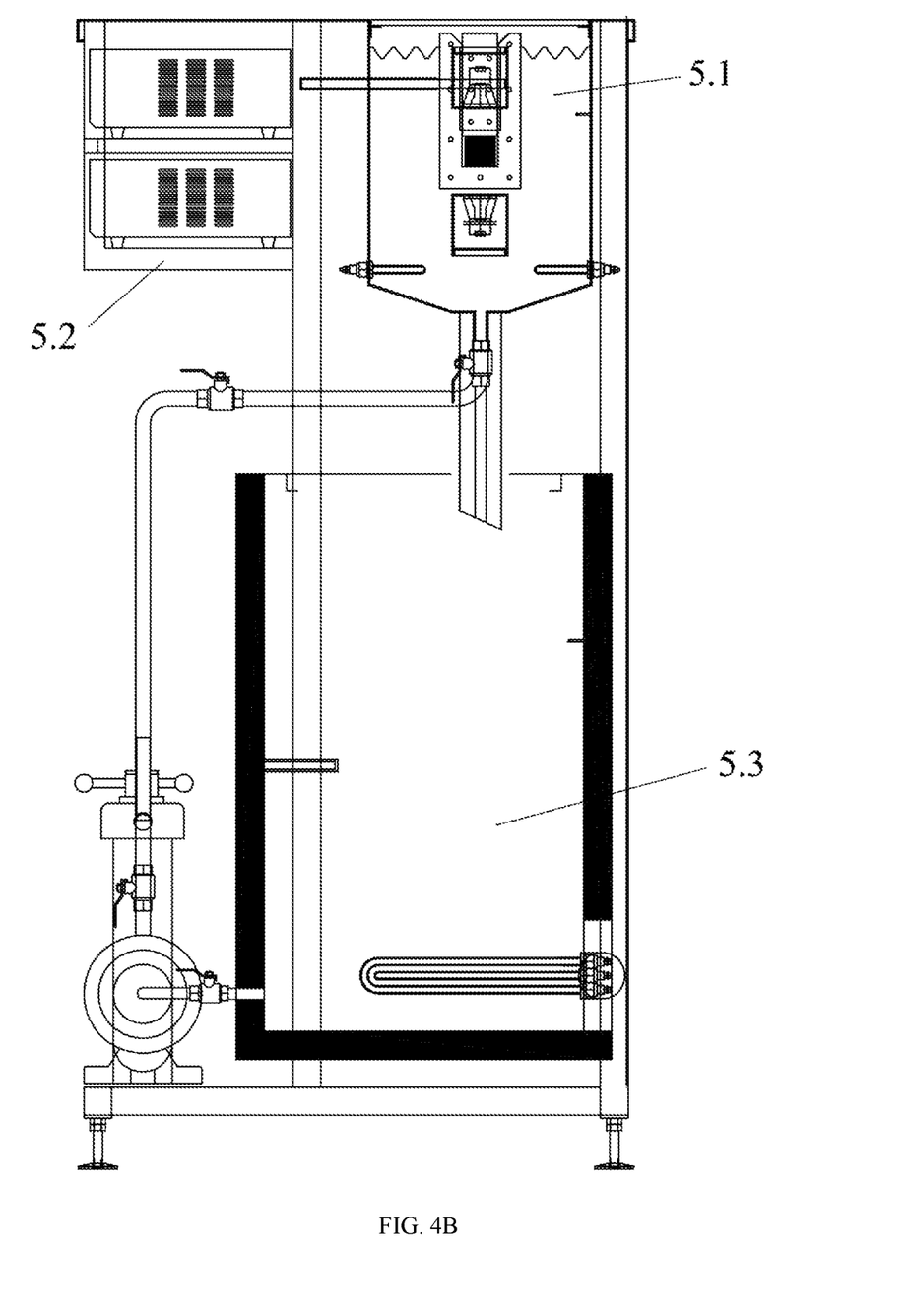
FIG. 4B is a side view of the ultrasonic cleaning machine of the double-pancake winding system according to the present invention.

As shown in FIGS. 4A-B, the ultrasonic cleaning machine 5 comprises a first cleaning chamber 5.1, an ultrasonic generator 5.2 arranged on a side of the first cleaning chamber 5.1, a deionized water tank 5.3 for storing deionized water and a cleaning liquid tank 5.4 for storing cleaning liquid. The deionized water tank 5.3 and the cleaning liquid tank 5.4 communicate with the first cleaning chamber 5.1 respectively by a pump and a pipeline. The superconducting conductor 10 enters the first cleaning chamber 5.1 from one end of the first cleaning chamber 5.1 and goes out from the other end of the first cleaning chamber 5.1. The deionized water and the cleaning liquid are fed into the first cleaning chamber 5.1 respectively from the deionized water tank 5.3 and the cleaning liquid tank 5.4, and ultrasonic waves are transmitted by the ultrasonic generator 5.2 into the first cleaning chamber 5.1 to clean the superconducting conductor. The ultrasonic cleaning machine 5 heats an alkaline bubble-free solution, and ultrasonically cleans the superconducting conductor 10 by the high-temperature alkaline bubble-free solution to remove oil on the surface of the superconducting conductor and then blow-dries the superconducting conductor, so that the surface of the superconducting conductor 10 cleaned by the ultrasonic cleaning machine 5 is clean and is capable of passing the water break test.

Figure 5:
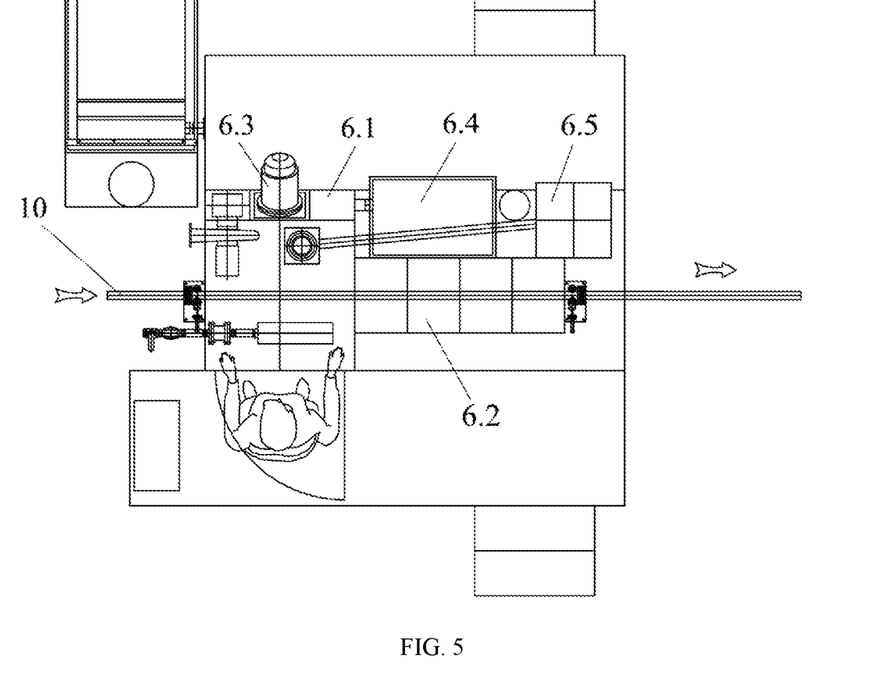
FIG. 5 is a schematic diagram of a sandblasting machine cleaning device of the bifilar winding system according to the present invention.

As shown in FIG. 5, the sandblasting and cleaning machine 6 comprises a sandblasting chamber 6.1, a second cleaning chamber 6.2, a sandblasting machine 6.3, a balanced water tank 6.4 and an automatic sand feeder 6.5. The superconducting conductor 10 enters the sandblasting chamber 6.1 from one end of the sandblasting chamber 6.1, then enters the second cleaning chamber 6.2 from one end of the second cleaning chamber 6.2 after going out from the other end of the sandblasting chamber 6.1, and finally goes out from the other end of the second cleaning chamber 6.2. The automatic sand feeder 6.5 is connected to the sandblasting machine 6.3. A sand jet of the sandblasting machine 6.3 communicates with the sandblasting chamber 6.1. The balanced water tank 6.4 communicates with the second cleaning chamber 6.2. The sandblasting and cleaning machine 6 blasts sands onto the surface of the superconducting conductor 10, and the roughness of the sandblasted surface is uniform and within Ra3-6 μm. The sandblasted conductor is cleaned by deionized water and blow-dried by finely filtered compressed air.

Figure 6:
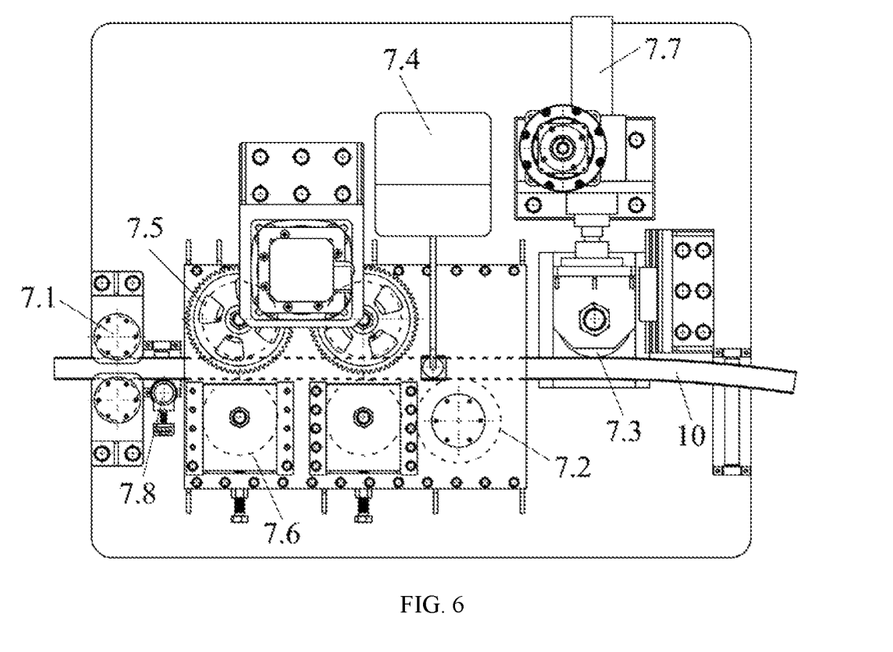
FIG. 6 is a schematic diagram of a bending machine of the bifilar winding system according to the present invention.

As shown in FIG. 6, the bending machine 7 comprises a pair of guiding wheels 7.1, a plurality of pairs of feeding wheels, a shaping wheel 7.2, a pressing wheel 7.3 and an inkjet printer 7.4, which are driven by a motor respectively. One feeding wheel in each pair of feeding wheels is a driving feeding wheel 7.5 and the other one is a driven feeding wheel 7.6. The superconducting conductor 10 is guided by the pair of guiding wheels 7.1, then successively passes through the plurality of pairs of feeding wheels and the shaping wheel 7.2, and then is sent to the pressing wheel 7.3. The pressing wheel 7.3 is driven by a motor or a piston cylinder 7.7 to do linear motion, and the pressing wheel 7.3 moves to the superconducting conductor 10 to bend the superconducting conductor 10. The inkjet printer 7.4 is arranged opposite to the shaping wheel 7.2, and by considering the position of the shaping wheel 7.2 as a feature point, sand is blasted onto the superconducting conductor 10 by the inkjet printer 7.4 at the feature point. The bending machine further comprises an encoder 7.8 that measures the length of the superconducting conductor 10 according to the length formed by rotation of the guiding wheel or driving feeding wheel. The bending machine 7 precisely measures the feeding length of the superconducting conductor 10, with the precision for measuring the length being superior to 300 ppm. The inkjet printer 7.4 is mounted on the bending machine 7 to spurt codes on the surface of the superconducting conductor 10 at the feature point, and the bending machine 7 bends a coil containing an inter-turn transition section into a high-precision radius with no tension.

Figure 7A:
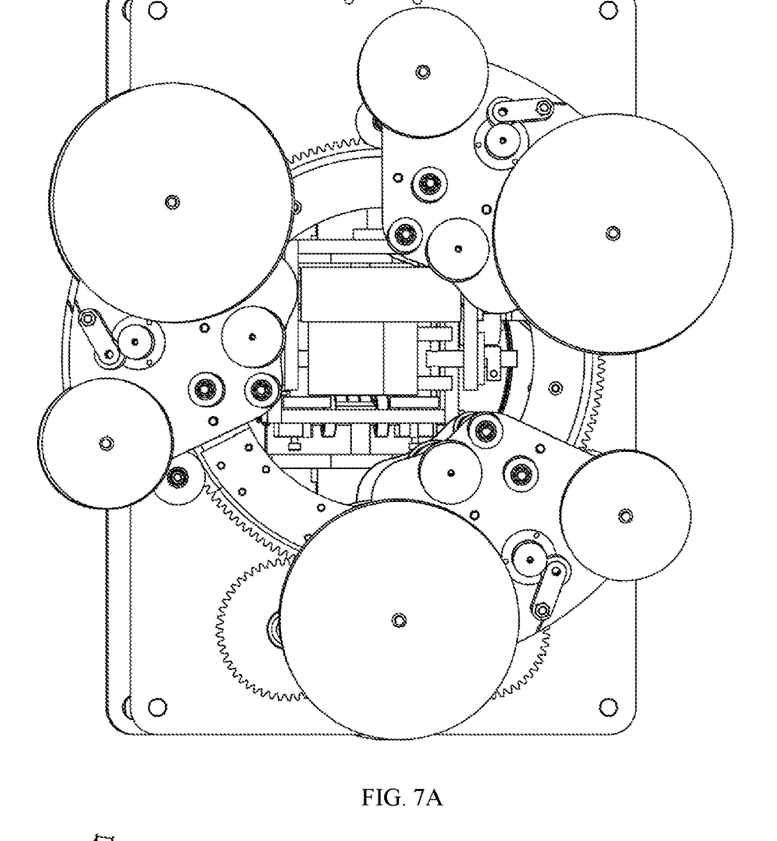
FIG. 7A is a side view of an inter-turn insulation taping machine of the double-pancake winding system according to the present invention.
Figure 7B:
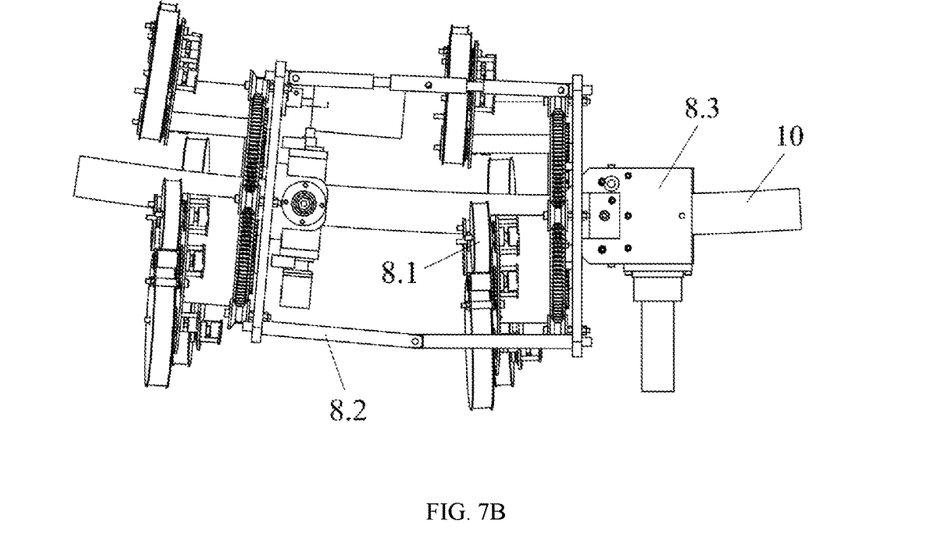
FIG. 7B is a top view of the inter-turn insulation taping machine of the double-pancake winding system according to the present invention.
Figure 8A:
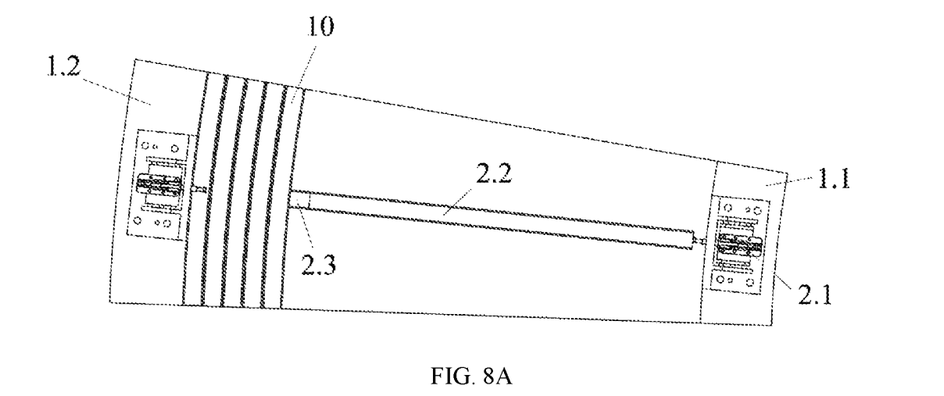
FIG. 8A is a top view of a dropping fixture of the bifilar winding system according to the present invention.
Figure 8B:
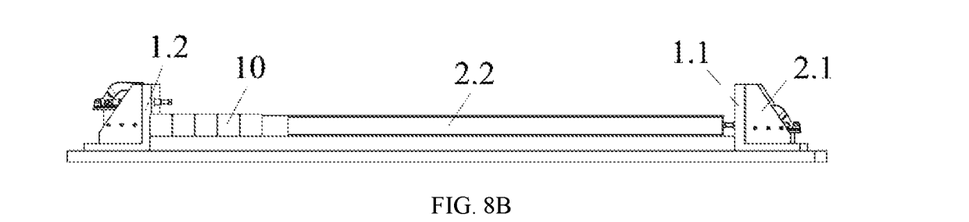
FIG. 8B is a side view of the dropping fixture of the bifilar winding system according to the present invention.

As shown in FIGS. 7A-B, in the inter-turn insulation taping machine 8, a taping wheel 8.1 wraps the superconducting conductor 10 passing through a frame 8.2 of the inter-turn insulation taping machine, and the frame 8.2 of the inter-turn insulation taping machine is an angle-adjustable bracket structure. A walking wheel 8.3 is arranged in an entering direction of the superconducting conductor 10 to lead the superconducting conductor. Multiple layers of insulating tape are wrapped by the inter-turn insulation taping machine in half-lapping manner with a constant tension, with a desired distance reserved between the layers of insulating tape, and the wrapped insulating tape is flat, without any wrinkle or bulge.

As shown in FIGS. 8A-B and 9A-B, the winding mold in the rotary platform 1 comprises an annular inner mold 1.1 and an annular outer mold 1.2, and the superconducting conductor needs to drop into a space between the inner mold 1.1 and the outer mold 1.2. The dropping fixture 2 comprises quick chucks 2.1 arranged on opposite sides of the inner mold 1.1 and the outer mold 1.2 and a transition rod 2.2 vertically connected to the quick chuck on the inner mold. An end, facing the outer mold 1.1, of the transition rod 2.2 is connected with a nylon pad 2.3. The superconducting conductor drops into the space between the inner mold 1.1 and the outer mold 1.2 and is wound along a circumference of the rotary platform. The superconducting conductor is limited between inner mold and the outer mold by the transition rod. The rotary platform 1 has a flatness of less than 1 mm under idle and load conditions, and the winding mold mounted on the rotary platform has a profile tolerance of less than 1 mm. A conductor holder 11 and a guide mechanism, by which the superconducting conductor 10 can fall onto the rotary platform 1 slowly and smoothly after being wrapped for inter-turn insulation, are mounted on the rotary platform 1. The dropping fixture 2 is mounted on the rotary platform 1, which drops the superconducting conductor 10 falling onto the rotary platform 1 into the winding mold and then tightly clamps the superconducting conductor to ensure that the superconducting conductor 10 is at a correct position within the profile of the winding mold. A reference line for coil feature points is drawn on the rotary platform 1, and a deviation between the drawn reference line and a theoretical reference line is less than 0.5 mm.

The bifilar winding system further comprises an automatic control system 9. The automatic control system 9 operates respective devices in the two superconducting coil winding production lines, the rotary platform 1 and respective devices on the rotary platform 1, separately or cooperatively. The automatic control system 9 recognizes an alarm signal, and continues alarming or makes an urgent halt according to the alarm signal. The automatic control system 9 coordinates and links respective devices by close-loop position control, which ensures high synchronization of respective devices in each production line, and realizes high synchronization of two production lines through the rotary platform.

The bifilar winding system of the present invention comprises two superconducting coil winding production lines which are symmetrically arranged, a rotary platform 1, a dropping fixture 2, a winding mold, and an automatic control system 9. Each superconducting coil winding production line comprises a conductor unwinding device 3, a straightener 4, an ultrasonic cleaning machine 5, a sandblasting and cleaning machine 6, a bending machine 7 and an inter-turn insulation taping machine 8.

As shown in FIG. 1, the conductor unwinding device 3, the straightener 4, the ultrasonic cleaning machine 5 and the sandblasting and cleaning machine 6 are used to preprocess the superconducting conductor. The bending machine 7, the inter-turn insulation taping machine 8, the dropping fixture 2, the rotary platform 1 and the winding mold, and the automatic control system 9, as key units of the winding production line, are used to realize the high-precision shaping of the conductor, carry out insulating treatment on the conductor, and accurately drop the conductor at a correct position within the profile of the winding mold.

As shown in FIGS. 2A-B, the conductor unwinding device 3 adjusts, by a telescoping mechanism on its top, the diameter of the conductor unwinding cylinder to bear a superconducting conductor having a diameter of about 4 m and a mass of about 14 t. Each turn of the superconducting conductor is mounted in a positioning groove of the conductor unwinding cylinder, respectively. During the winding of a coil, the conductor unwinding device unwinds, by rotating and lifting (the lifting unit is not shown), the superconducting conductor according to a coil winding direction and a coil winding speed and ensures that the superconducting conductor is unwound at the same height. The pre-straightener 3.2 mounted on the conductor unwinding device pre-straightens the superconducting conductor and provides the straightening device in the subsequent process with the superconducting conductor having a constant radius (R=3500 mm).

As shown in FIGS. 3A-B, the straightener 4 is a structure having seven rollers. During the winding of a coil, the conductor is precisely straightened by adjusting the reduction of three driven wheels. The straightness of the straightened conductor is not greater than 0.3 mm/1000 mm.

As shown in FIGS. 4A-B, the ultrasonic cleaning machine 5 comprises a mechanical dynamic seal, an ultrasonic cleaning chamber, a deionized water chamber, a compressed air blow-drying system. The mechanical dynamic seal is used to dynamically seal the ultrasonic cleaning liquid during the feeding of the conductor. The ultrasonic cleaning system ultrasonically cleans the conductor at a specific power (2.5 kW) and at a specific frequency (28 kHz) to remove oil. By the deionized water cleaning chamber and the compressed air blow-drying system, the conductor is cleaned again and dried. A heating rod and a temperature control system are mounted in the cleaning liquid tank and the ultrasonic cleaning chamber. The heating rod can heat an alkaline bubble-free cleaning liquid (working temperature: 55° C.). The temperature control system can control the temperature.

As shown in FIG. 5, the sandblasting and cleaning machine 6 blasts sands onto the surface of the superconducting conductor, by using a mixture of $Al_2O_3$ white corundum sands and water (a ratio of water to sands: 3:1) as the abrasive and 6 bar oil-free compressed air as the power source for accelerating the abrasive. In addition, the sandblasting and cleaning machine is equipped with a cyclone separation system and an automatic sand-feeding system by which, fine sands can be filtered and removed in real time after sandblasting and a certain quantity of new sands can be automatically fed at regular intervals, in order to ensure a constant ratio of water to sands in the sand chamber and a uniform grain of the abrasive. The roughness of the sandblasted surface of the conductor is uniform and within Ra3-6 μm. A secondary deionized water cleaning nozzle and a secondary compressed air blow-drying system are provided in the second cleaning chamber of the sandblasting and cleaning machine, to completely clean and dry the sandblasted conductor. The surface of the superconducting conductor, which is cleaned and blow-dried by the secondary compressed air blow-drying system, is clean, without any visible residue on a piece of white silk fabric after wiping the surface by it.

Figure 9A:
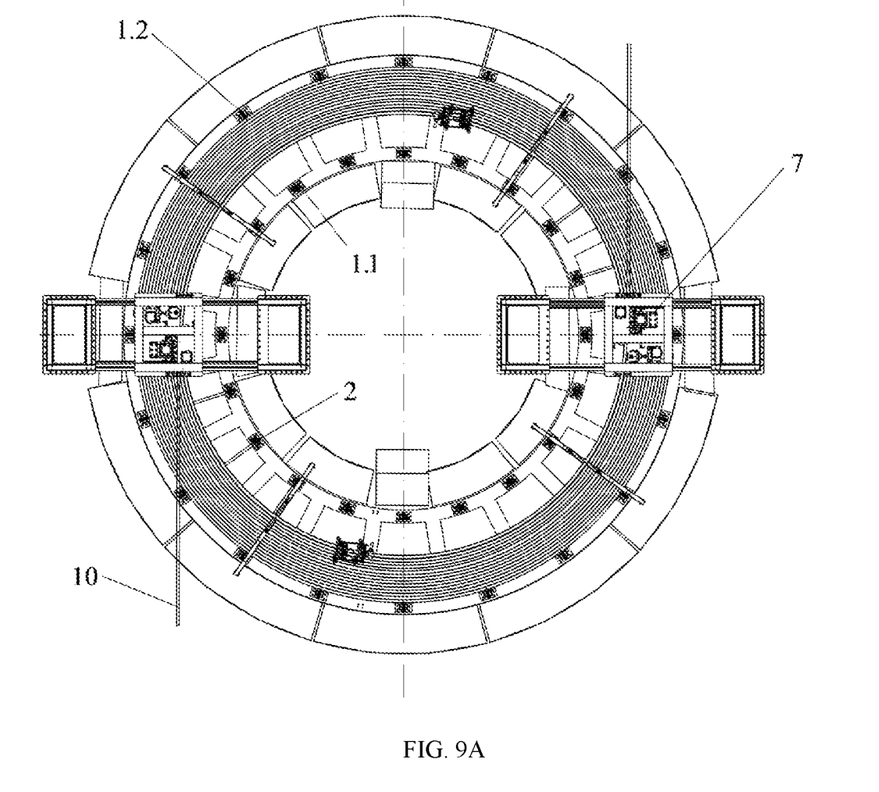
FIG. 9A is a top view of a rotary platform, a mold and a conductor dropping fixture of the bifilar winding system according to the present invention.
Figure 9B:
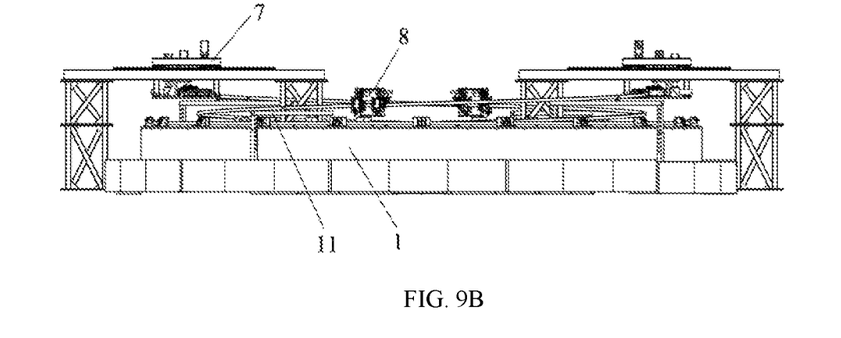
FIG. 9B is a side view of the rotary platform, the mold and the conductor dropping fixture of the bifilar winding system according to the present invention.

As shown in FIGS. 1 and 9A-B, the bending machine 7, the inter-turn insulation taping machine 8, the rotary platform 1 and the winding mold, the dropping fixture 2 and the automatic control system 9 are key units of the winding production line.

As shown in FIG. 6, the bending machine 7 bends the superconducting conductor, based on the principle of shaping by three rollers. The feeding length of the conductor is the most critical parameter for coil winding. A high-precision and contact-type absolute value encoder roller (a length measurement mechanism) is mounted on the bending machine, with the precision for measuring the length being superior to 300 ppm. In addition, an online inkjet printing system is mounted on the bending machine, which spurts codes at the feature points of the coil. The reduction of the pressing wheel on the bending machine is controlled in a closed-loop system by a servo moor and a high-precision grating scale, in order to form a bending radius highly precisely and accurately.

As shown in FIGS. 7A-B, by the inter-turn insulation taping machine 8, multiple layers of glass tape and polyimide tape are online composited and wrapped in half-lapping manner around the bent conductor, with a damper mounted the tape spool. During the inter-turn insulation treatment, an automatic wrapping machine, which is insulating, wraps the conductor while walking on it, by a walking mechanism and a rotating mechanism, according to a half-lapping wrapping proportion. The damper mounted on the tape spool can effectively control the wrapping tension. An angle adjustment mechanism can realize the adjustment of angle of the wrapping machine, so that it is applicable to automatic inter-turn insulation wrapping of conductors having different bending radii.

As shown in FIGS. 8A-B and 9A-B, the rotary platform 1, which rotates according to the coil winding direction and the coil winding speed, has a flatness superior to 1 mm under idle and load conditions. The winding mold mounted on the rotary platform is a criterion for controlling the shape of the coil. The inner and outer winding molds have a profile tolerance of not greater than 1 mm. A conductor holding tool is mounted on the rotary platform, by which the conductor can fall onto the rotary platform slowly and smoothly after being wrapped for inter-turn insulation. The dropping fixture mounted on the rotary platform can quickly clamp the superconducting conductor falling onto the rotary platform, to ensure that the conductor is at a correct radial position. In addition, a reference line for coil feature points is drawn on the rotary platform, and the deviation between the drawn reference line and a theoretical reference line is not greater than 0.5 mm.

To drop the superconducting conductor, the radial size and the circumferential position of each turn of conductor are two most important parameters. When the superconducting conduct falls onto the rotary platform, the conductor is clamped by the dropping fixture, to ensure that the deviation between the actual radial size of each turn of conductor, which is already dropped, and the theoretical size is not greater than 0.5 mm. In addition, by monitoring the deviation between the reference line on the conductor and the reference line on the rotary platform, and by compensating for the feeding length of the conductor by the automatic control system, the conductor is ensured to be at a correct circumferential position, thereby avoiding the insulating over-pressing at the inter-turn transition.

The automatic control system 9 operates all sub-systems separately or cooperatively. The automatic control system recognizes an alarm signal, and continues alarming or makes an urgent halt according to the alarm signal. The automatic control system coordinates and links respective devices in each production line by close-loop position control, which ensures high synchronization of respective devices in each production line, and realizes high synchronization of the two production lines through the rotary platform. The distribution of control axes of the automatic control system is shown in Table 1.

TABLE 1

Definition and distribution of control axes

| Motor axis | Location | Function |
|---|---|---|
| M1 | Conductor unwinding unit (A) | Lifting the conductor unwinding cylinder up or down |
| M2 | Conductor unwinding unit (A) | Rotating the conductor unwinding cylinder |
| M3 | Conductor unwinding unit (A) | Pre-straightening the conductor |
| M4 (3A) | Conductor unwinding unit (A) | Straightening the conductor |
| M5 (4A) | Conductor bending unit (A) | Feeding the conductor |
| Imaginary axis 1 | Conductor bending unit (A) | Measuring the feeding length of the conductor |
| M6 (5A) | Conductor bending unit (A) | Moving the bending machine radially |
| M7 (6A) | Conductor bending unit (A) | Bending the conductor |
| M8 (7) | Rotary platform unit | Rotating the rotary platform |
| M9 (8) | Rotary platform unit | Rotating the rotary platform |
| M10 (6B) | Conductor bending unit (B) | Bending the conductor |
| M11 (5B) | Conductor bending unit (B) | Moving the bending machine radially |
| M12 (4B) | Conductor bending unit (B) | Feeding the conductor |
| Imaginary axis 2 | Conductor bending unit (B) | Measuring the feeding length of the conductor |
| M13 (3B) | Conductor straightening unit (B) | Straightening the conductor |
| M14 | Conductor unwinding unit (B) | Pre-straightening the conductor |
| M15 | Conductor unwinding unit (B) | Rotating the conductor unwinding cylinder |
| M16 | Conductor unwinding unit (B) | Lifting the conductor unwinding cylinder up or down |

Figure 10:
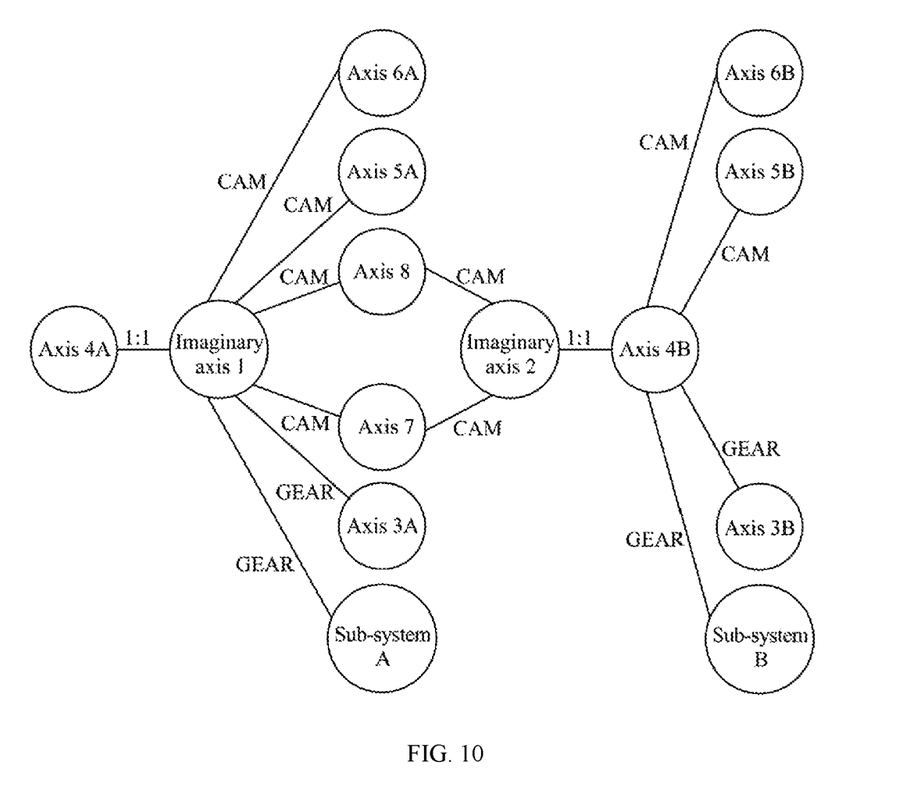
FIG. 10 is a logic diagram of axes of an automatic control system of the bifilar winding system according to the present invention.

In the present invention, the automatic control system for the bifilar winding production line uses a SIEMENSSIMOTIOND multi-axis motion control module to realize the synchronous control of the axes of motion. To reduce the control axes and decrease the difficulty of control, the conductor unwinding device is independent of the control system. The conductor unwinding device, as a sub-system, may be synchronously controlled via an IO interface. As shown in FIG. 10, during the winding of a coil, the automatic control system uses the conductor feeding lengths measured by the encoders in line A and line B, respectively, as references for the position loop, in order to realize the synchronous motion of all devices in a single production line. During the bifilar winding of a coil, by using the line A as the reference, the motion speed parameters of the line B are obtained from the rotation speed and the position of the rotary platform to realize the high-precision synchronization of movement of two production lines.

We claim:

1. A bifilar winding system for the manufacture of a poloidal field superconducting magnet for nuclear fusion, comprising:
   two superconducting coil winding production lines which are symmetrically arranged;
   a rotary platform;
   a dropping fixture; and a winding mold;

wherein each of the two superconducting coil winding production lines comprises a conductor unwinding device, a straightener, an ultrasonic cleaning machine, a sandblasting and cleaning machine, a bending machine, and an inter-turn insulation taping machine; the bending machine and the inter-turn insulation taping machine in each of the two superconducting coil winding production lines are arranged on the rotary platform, and the dropping fixture and the winding mold are arranged on the rotary platform; during the winding of a coil, a superconducting conductor is unwound by the conductor unwinding device in each of the two superconducting coil winding production lines, then straightened by the straightening machine, ultrasonically cleaned by the ultrasonic cleaning machine, sandblasted and cleaned by the sandblasting and cleaning machine, and bent into a desired radius by each of the bending machines on the rotary platform, then wrapped with multiple layers of insulating tape by each of the inter-turn insulation taping machines, and finally fixed, by the dropping fixture, at a correct position within a profile of the winding mold.

2. The bifilar winding system of claim 1, wherein the conductor unwinding device comprises a pre-straightener and a conductor unwinding cylinder that is rotatable and is driven by a motor; a superconducting conductor to be wound is wound around the conductor unwinding cylinder, and the conductor unwinding cylinder is driven by the motor to unwind the superconducting conductor; the conductor unwinding device bears the superconducting conductor having a diameter of 3.5-4.5 m and a mass of 12-16 t; the conductor unwinding device unwinds the superconducting conductor according to a coil winding direction and a coil winding speed and ensures that the superconducting conductor is unwound at a same height; and the conductor unwinding device pre-straightens the superconducting conductor and provides the straightening device in a subsequent process with the superconducting conductor having a constant radius.

3. The bifilar winding system of claim 1, wherein the straightener comprises a row of driving wheels which are rotatable and are driven by a motor and a row of driven wheels opposite to the row of driving wheels; the driving wheels and the driven wheels are alternately arranged; the superconducting conductor passes between the row of driving wheels and the row of driven wheels, and the superconducting conductor is straightened by the driving wheels and the driven wheels; and the superconducting conductor having a constant radius is straightened in high precision by the straightener, and a straightness of the straightened superconducting conductor is superior to 0.3 mm/1000 mm.

4. The bifilar winding system of claim 1, wherein the ultrasonic cleaning machine comprises a first cleaning chamber, an ultrasonic generator arranged on a side of the first cleaning chamber, a deionized water tank for storing deionized water and a cleaning liquid tank for storing cleaning liquid; the deionized water tank and the cleaning liquid tank communicate with the first cleaning chamber respectively by a pump and a pipeline; the superconducting conductor enters the first cleaning chamber from one end of the first cleaning chamber and goes out from the other end of the first cleaning chamber; the deionized water and the cleaning liquid are fed into the first cleaning chamber respectively from the deionized water tank and the cleaning liquid tank, and ultrasonic waves are transmitted by the ultrasonic generator into the first cleaning chamber to clean the superconducting conductor; the ultrasonic cleaning machine heats an alkaline bubble-free solution, and ultrasonically cleans the superconducting conductor by the high-temperature alkaline bubble-free solution to remove oil on a surface of the superconducting conductor and then blow-dries the superconducting conductor, so that a surface of the superconducting conductor cleaned by the ultrasonic cleaning machine is clean and is capable of passing a water break test.

5. The bifilar winding system of claim 1, wherein the sandblasting and cleaning machine comprises a sandblasting chamber, a second cleaning chamber, a sandblasting machine, a balanced water tank and an automatic sand feeder; the superconducting conductor enters the sandblasting chamber from one end of the sandblasting chamber, then enters the second cleaning chamber from one end of the second cleaning chamber after going out from the other end of the sandblasting chamber, and finally goes out from the other end of the second cleaning chamber; the automatic sand feeder is connected to the sandblasting machine; a sand jet of the sandblasting machine communicates with the sandblasting chamber; the balanced water tank communicates with the second cleaning chamber; the sandblasting and cleaning machine blasts sands onto a surface of the superconducting conductor; the roughness of the sandblasted surface is uniform and within Ra_3-6 μm; and the sandblasted conductor is cleaned by deionized water and blow-dried by finely filtered compressed air.

6. The bifilar winding system of claim 1, wherein the bending machine comprises a pair of guiding wheels, a plurality of pairs of feeding wheels, a shaping wheel, a pressing wheel and an inkjet printer, which are driven by a motor respectively; one feeding wheel in each pair of feeding wheels is a driving feeding wheel and the other one of the pair is a driven feeding wheel; the superconducting conductor is guided by the pair of guiding wheels, and successively passes through the plurality of pairs of feeding wheels and the shaping wheel, and then is sent to the pressing wheel; the pressing wheel is driven by a motor or a piston cylinder to do linear motion, and the pressing wheel moves to the superconducting conductor to bend the superconducting conductor; the inkjet printer is arranged opposite to the shaping wheel, and by considering a position of the shaping wheel as a feature point, sand is blasted onto the superconducting conductor by the inkjet printer at the feature point; the bending machine further comprises an encoder that measures a length of the superconducting conductor according to a length formed by rotation of the guiding wheel or the driving feeding wheel; the bending machine precisely measures the length of the superconducting conductor, with a precision for measuring the length being superior to 300 ppm; the inkjet printer is mounted on the bending machine to spurt codes on the surface of the superconducting conductor at the feature point; and the bending machine bends a coil containing an inter-turn transition section into a high-precision radius with no tension.

7. The bifilar winding system of claim 1, wherein multiple layers of insulating tape are wrapped by the inter-turn insulation taping machine in half-lapping manner with a constant tension, with a desired distance reserved between the layers of insulating tape, and the wrapped insulating tape is flat, without any wrinkle or bulge.

8. The bifilar winding system of claim 1, wherein the rotary platform has a flatness of less than 1 mm under idle and load conditions, and the winding mold mounted on the rotary platform has a profile tolerance of less than 1 mm; a conductor holder and a guide mechanism, by which the superconducting conductor falls onto the rotary platform slowly and smoothly after being wrapped for inter-turn insulation, are mounted on the rotary platform; the dropping fixture is mounted on the rotary platform, which drops the superconducting conductor falling onto the rotary platform into the winding mold and then tightly clamps the superconducting conductor to ensure that the superconducting conductor is at a correct position within the profile tolerance of the winding mold; a reference line for a coil feature point is drawn on the rotary platform, and a deviation between the drawn reference line and a theoretical reference line is less than 0.5 mm.

9. The bifilar winding system of claim 1, further comprising an automatic control system, wherein the automatic control system operates respective devices in the two superconducting coil winding production lines, the rotary platform and respective devices on the rotary platform, separately or cooperatively; the automatic control system recognizes an alarm signal, and continues alarming or makes an urgent halt according to the alarm signal; and the automatic control system coordinates and links the respective devices by close-loop position control, which ensures high synchronization of respective devices in each of the two superconducting coil winding production lines, and realizes high synchronization of the two superconducting coil winding production lines through the rotary platform.

* * * * *